US012705191B2

(12) United States Patent
Thanos et al.

(10) Patent No.: US 12,705,191 B2
(45) **Date of Patent: *Aug. 11, 2026**

(54) COMPUTE EXPRESS LINK MEMORY AND STORAGE MODULE

(71) Applicant: Micron Technology, Inc., Boise, ID (US)

(72) Inventors: William Thanos, Boise, ID (US); Jeremy Werner, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/024,712

(22) Filed: Jan. 16, 2025

(65) Prior Publication Data

US 2025/0156345 A1 May 15, 2025

Related U.S. Application Data

(63) Continuation of application No. 18/124,411, filed on Mar. 21, 2023, now Pat. No. 12,210,466.

(60) Provisional application No. 63/322,085, filed on Mar. 21, 2022.

(51) Int. Cl.

| | |
|---|---|
| ***G06F 12/00*** | (2006.01) |
| ***G06F 13/16*** | (2006.01) |
| ***G06F 13/28*** | (2006.01) |
| ***G06F 13/38*** | (2006.01) |

(52) U.S. Cl.

CPC .......... *G06F 13/1668* (2013.01); *G06F 13/28* (2013.01); *G06F 13/385* (2013.01)

(58) Field of Classification Search

CPC ..... G06F 13/1668; G06F 13/28; G06F 13/385

See application file for complete search history.

(56) References Cited

U.S. PATENT DOCUMENTS

| | | | |
|---|---|---|---|
| 9,213,609 | B2 | 12/2015 | Hansen et al. |
| 10,445,236 | B2 | 10/2019 | Boyle |
| 11,886,754 | B2 | 1/2024 | Prather |
| 2014/0195480 | A1 | 7/2014 | Talagala et al. |
| 2018/0137020 | A1 | 5/2018 | Kanai |
| 2020/0242068 | A1 | 7/2020 | Lin |
| 2021/0374056 | A1 | 12/2021 | Malladi |
| 2022/0066636 | A1* | 3/2022 | Taki ...................... G06F 3/0679 |
| 2022/0100669 | A1* | 3/2022 | Choe .................. G06F 12/0877 |

(Continued)

FOREIGN PATENT DOCUMENTS

| | | | |
|---|---|---|---|
| CN | 102609378 | A | 7/2012 |
| KR | 20210122667 | A * | 12/2009 |
| KR | 20230173059 | A | 12/2023 |

(Continued)

*Primary Examiner* — Shawn X Gu
*Assistant Examiner* — Mohammad S Hasan
(74) *Attorney, Agent, or Firm* — Brooks, Cameron & Huebsch, PLLC

(57) ABSTRACT

An apparatus can include control circuitry, a non-volatile memory device, and a volatile memory device. The control circuitry can be configured to receive a command presented according to a compute express link (CXL) protocol. The control circuitry can be further configured to cause data to be written to the non-volatile memory device or the volatile memory device, or both, in response to receipt of the command while refraining from writing the data to a cache that is external to the apparatus.

20 Claims, 5 Drawing Sheets

350

RECEIVING A COMMAND TARGETING A MEMORY SYSTEM THAT INCLUDES A NON-VOLATILE MEMORY DEVICE AND A VOLATILE MEMORY DEVICE, WHEREIN THE COMMAND IS PRESENTED ACCORDING TO A COMPUTE EXPRESS LINK (CXL) PROTOCOL — 352

CAUSING DATA TO BE WRITTEN TO THE NON-VOLATILE MEMORY DEVICE OR THE VOLATILE MEMORY DEVICE, OR BOTH, IN RESPONSE TO RECEIPT OF THE COMMAND WHILE REFRAINING FROM WRITING THE DATA TO A CACHE THAT IS EXTERNAL TO THE MEMORY SYSTEM — 354

(56) References Cited

U.S. PATENT DOCUMENTS

2023/0024949 A1* 1/2023 Ammari .............. G06F 13/1668

FOREIGN PATENT DOCUMENTS

TW I590059 B * 12/2009
TW 1590059 B 7/2017

* cited by examiner

Figure 3:
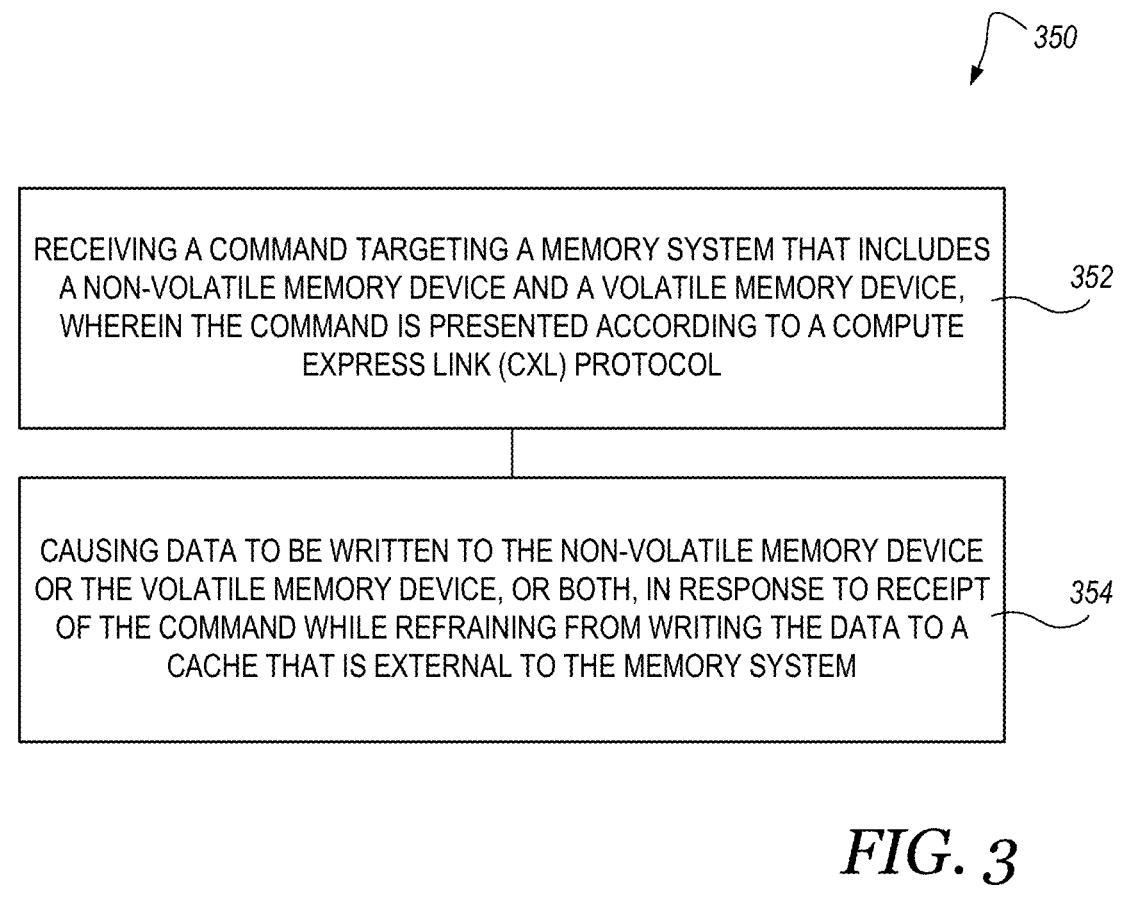

350

RECEIVING A COMMAND TARGETING A MEMORY SYSTEM THAT INCLUDES A NON-VOLATILE MEMORY DEVICE AND A VOLATILE MEMORY DEVICE, WHEREIN THE COMMAND IS PRESENTED ACCORDING TO A COMPUTE EXPRESS LINK (CXL) PROTOCOL

352

CAUSING DATA TO BE WRITTEN TO THE NON-VOLATILE MEMORY DEVICE OR THE VOLATILE MEMORY DEVICE, OR BOTH, IN RESPONSE TO RECEIPT OF THE COMMAND WHILE REFRAINING FROM WRITING THE DATA TO A CACHE THAT IS EXTERNAL TO THE MEMORY SYSTEM

COMPUTE EXPRESS LINK MEMORY AND STORAGE MODULE

PRIORITY INFORMATION

This application is a Continuation of U.S. application Ser. No. 18/124,411, filed Mar. 11, 2023, which claims the benefit of U.S. Provisional Application No. 63/322,085, filed on Mar. 21, 2022, the contents of which are incorporated herein by reference.

TECHNICAL FIELD

The present disclosure relates generally to semiconductor memory and methods, and more particularly, to apparatuses, systems, and methods for a Compute Express Link memory and storage module.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

BRIEF DESCRIPTION OF THE DRAWINGS

FIG. 3 is a flow diagram corresponding to a method for a Compute Express Link memory and storage module in accordance with some embodiments of the present disclosure.

DETAILED DESCRIPTION

Figure 1A:
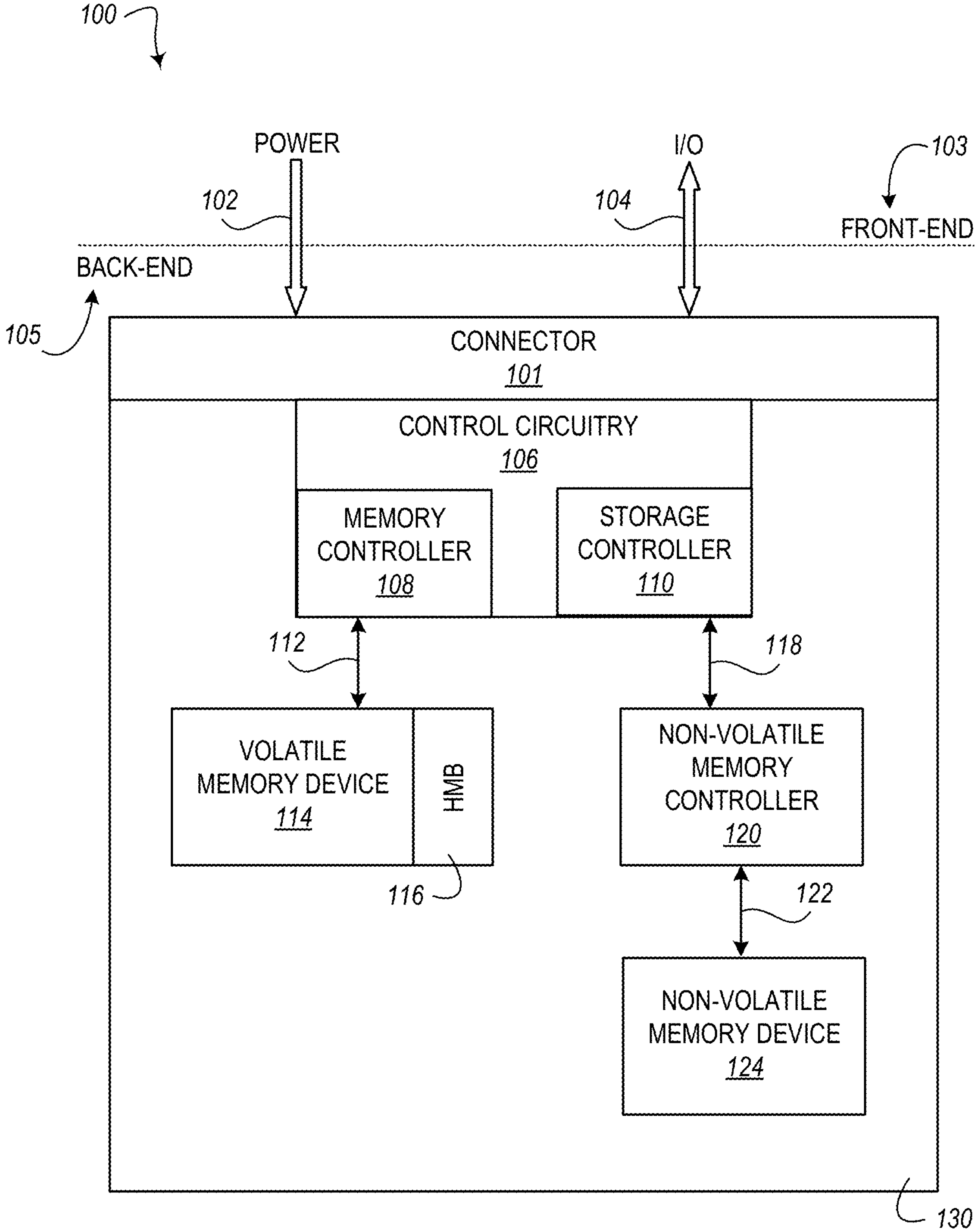
FIG. 1A illustrates a functional block diagram in the form of an apparatus including a memory sub-system that includes a connector, control circuitry, a volatile memory device, a non-volatile memory controller, and a non-volatile memory device in accordance with a number of embodiments of the present disclosure.

Computing devices and, more particularly, mobile computing devices such as laptops, tablets, convertible laptop tablets, phablets, smartphones, etc. are widely utilized for a variety of purposes. However, due to size constraints associated with form factors of mobile computing devices, a delicate balance can be struck between the size of the mobile computing device and an amount of available space within the mobile computing device to house components necessary to operation of the mobile computing device. As an example, as consumers demand thinner laptops, the amount of available space or "real estate" within the laptop to house processing devices, memory devices, graphics processing devices, power supplies, batteries, and other constituent components of the laptop is reduced.

In some approaches, such components can be placed closer to one another in an effort to allow for the size of the laptop to be reduced (e.g., to make the laptop thinner); however, this solution can lead to increased temperatures, which can be further exacerbated by reduced thermal dissipation efficiency. In other approaches, the physical size (e.g., the "footprint") of each of the components can be reduced in an effort to allow for the size of the laptop to be reduced; however, this can, in some approaches, lead to decreased processing capability, reduced storage capability, and/or reduced battery life in approaches where the size of the power supply and/or battery is reduced.

Aspects of the present disclosure address the above and other deficiencies through the use of a special purpose system (referred to in the alternative herein as a "memory sub-system" or "hybrid memory sub-system") that includes multiple types of memory, such as volatile memory resources and non-volatile memory resources, on a single module, package, and/or substrate. The special purpose system described herein can preferably be utilized in a client (as opposed to enterprise) personal computing device, such as a laptop, desktop, mobile computing device, etc.) although embodiments are not so limited. In general, a "client personal computing device" refers to a mass produced computing device that is available for purchase by consumers.

As used herein, a volatile memory resource may be referred to in the alternative as a "non-persistent memory device" while a non-volatile memory resource may be referred to in the alternative as a "persistent memory device." However, a persistent memory device can more broadly refer to the ability to access data in a persistent manner. As an example, in the persistent memory context, the memory device can store logical to physical mapping or translation data and/or lookup tables in a memory array in order to track the location of data in the memory device, separate from whether the memory is non-volatile. Further, a persistent memory device can refer to both the non-volatility of the memory in addition to utilizing such non-volatility by including the ability to service commands for successive processes (e.g., by using logical to physical mapping, look-up tables, etc.).

As described in more detail, herein, the special purpose system can include a controller that can be configured to communicate with other components of a computing device, such a host computing device (e.g., a central processing unit)

via a compute express link (CXL) interface. Accordingly, in some embodiments, the memory sub-system can be a Compute Express Link (CXL) compliant memory sub-system (e.g., the memory sub-system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

Further aspects of the disclosure can allow for the special purpose system (e.g., the memory sub-system) described herein to perform operations that are traditionally performed by a host computing device and/or by a memory device associated with the host computing device, thereby reducing data traffic and/or interface bandwidth between the memory sub-systems described herein and the host computing device.

For example, the special purpose system described herein can include one or more controllers that can orchestrate performance of certain operations within the special purpose system without transferring data to external circuitry, such as a host computing device and/or by a memory device associated with the host computing device. Stated alternatively, data can be written to the volatile memory resources and non-volatile memory resources of the memory sub-system as opposed to a cache and/or memory device associated with a host computing device, thereby reducing (or even removing) the need for host caches and/or memory devices.

Still further aspects of the disclosure can allow for a physical size of the memory sub-systems described herein to be less than a physical size of the constituent components thereof in other approaches. For example, due to standardized form factors employed in many approaches, a physical size of a volatile memory device and a non-volatile memory device employed in such approaches can be around 2,700 $mm^2$ (around 2,100 $mm^2$ for a traditional SO-DIMM memory module plus 660 $mm^2$ for a traditional M.2 form factor solid-state drive (SSD)). In contrast, in some embodiments disclosed herein, the memory sub-system, which can include at least one volatile memory device and at least one non-volatile memory device, can have a physical size of around 1,000 $mm^2$.

In addition, embodiments herein can allow for a quantity of pins (e.g., input/output (I/O) pins, DQs, power pins, data transfer pins, etc.) associated with the memory sub-system to be reduced in comparison to some approaches. For example, a traditional volatile memory device (e.g., a DRAM module, such as a DDR3 SO-DIMM module) generally includes 204 pins while a traditional non-volatile memory device (e.g., a small form factor SSD, such as an M.2 form factor SSD) generally includes 66 pins. However, the memory sub-systems described herein can be provided with around 100 pins while retaining the functionality of more traditional systems.

As described in more detail herein, aspects of the present disclosure can be facilitated through the use of a front-end architecture that can allow for communications under both CXL protocols and peripheral component interconnect express (PCIe) protocols to be handled using a single and/or shared interface or bus. For example, embodiments herein can allow for a same physical layer (e.g., the PHY layer of the open systems interconnect (OSI) model of computing) to support communications between the memory sub-systems described herein and circuitry external to such memory sub-systems according to both the CXL protocol and the PCIe protocol.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," "X," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 130 may reference element "30" in FIG. 1A, and a similar element may be referenced as 230 in FIG. 2. A group or plurality of similar elements or components may generally be referred to herein with a single element number. For example, a plurality of reference elements 216-1 to 216-N may be referred to generally as 216. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

One or more Figures herein illustrate a memory sub-system and/or components of a memory sub-system in accordance with a number of embodiments of the present disclosure. For example, FIG. 1A illustrates a functional block diagram in the form of an apparatus 100 including a memory sub-system 130 that includes a connector 101, control circuitry 106, a volatile memory device 114, a non-volatile memory controller 120, and a non-volatile memory device 124 in accordance with a number of embodiments of the present disclosure.

In some embodiments, the controller 106, the storage controller 110, and/or the non-volatile memory controller 120 can be implemented as a single ASIC, FPGA, or other similar implementation. Such embodiments can allow for power consumption between interfaces that communicate with external circuitry (e.g., circuitry on the front-end 103) and circuitry internal to the memory sub-system 130 (e.g., the back-end 105) to be reduced in comparison to other approaches.

As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1, the memory sub-system 130 can include one or more memory modules (e.g., single in-line memory modules, dual in-line memory modules, etc.). The memory sub-system 130 can include volatile memory device(s) 114 and/or non-volatile memory device(s) 124. In a number of embodiments, the apparatus 100 and/or the memory sub-system 130 can be a multi-chip device. A multi-chip device can include a number of different memory types and/or memory modules. For example, the memory sub-system 130 can include non-volatile or volatile memory on any type of a module. The memory sub-system 130 can provide main memory for a computing system and/or can be used as additional memory or storage throughout the computing system.

As described herein, the memory sub-system 130 can be provided on a single substrate, "package," or "module," although embodiments are not so limited. In embodiments in which the memory sub-system 130 is provided on a single substrate or package, the memory sub-system 130 can include all the components necessary (e.g., memory device, control circuity, pins, power connectors, etc.) to perform the operations described herein. Further, in embodiments in which the memory sub-system 130 is provided on a single substrate, package, or module the memory sub-system 130 can be provided such that the memory sub-system 130 can be fully decoupled from a motherboard or backplane that utilizes the memory sub-system 130. Accordingly, in some embodiments, the memory sub-system 130 can be swapped in or out of a computing system (e.g., by being couple to or decoupled from the motherboard or backplane associated with the computing system). This can allow for the memory sub-system 130 to be upgraded, downgraded, and/or replaced in case of a failure involving the memory sub-system 130.

In some embodiments, the memory sub-system 130 can be approximately 40 mm wide and/or 25 mm deep, leading to an area of around 1,000 $mm^2$. In some embodiments, the memory sib-system 130 can have a thickness of around 2 mm. As described herein, the memory sub-system 130 can be provided in the form of an ASIC, FPGA, or similar architecture, although embodiments are not so limited.

The volatile memory device 114 can include one or more arrays of memory cells, e.g., volatile memory cells. The arrays of memory cells of the volatile memory device 114 can include one or more transistors and/or one or more capacitors. For instance, the volatile memory device 114 can include RAM, DRAM, and/or SRAM, among others. In some embodiments, the volatile memory device 114 is a DDR5 memory device. Although shown as a single volatile memory device 114, it will be appreciated that multiple volatile memory devices are contemplated within the scope of the disclosure.

The volatile memory device 114 can include a host memory buffer (HMB) 116 or can be coupled to a HMB 116. That is, in some embodiments, the HMB 116 can be a partition of the volatile memory device 114 while in other embodiments, the HMB 116 is a discrete collection of memory cells coupled to the volatile memory device 114.

The HMB 116 can include a logical-to-physical (L2P) mapping table (not explicitly shown so as to not obfuscate the drawings). The L2P mapping table can be stored in a data structure within the HMB 116. In some embodiments, the L2P mapping table provides mappings between logical addresses of data written to the volatile memory device 114 and physical locations within the volatile memory device 114 to which such data is written.

The non-volatile memory device 124 can include one or more arrays of memory cells, e.g., non-volatile memory cells. The arrays of memory cells of the non-volatile memory device 124 can be flash arrays with a NAND architecture, for example. In some embodiments, the non-volatile memory device 124 can include one or more flash memory devices such as NAND or NOR flash memory devices.

The non-volatile memory device 124 can comprise a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

In embodiments in which the non-volatile memory device 124 is a flash memory device with a NAND architecture, the arrays of memory cells of the non-volatile memory device 124 can include one or more different types of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, the non-volatile memory device 124 can include one or more arrays of memory cells such as SLCs, MLCs, TLCs, QLCS, or any combination of such. In some embodiments, the non-volatile memory device 124 can include an SLC portion, and an MLC portion, a TLC portion, a QLC portion, or a PLC portion of memory cells, or any combination thereof. The memory cells of the non-volatile memory device 124 can be grouped as pages that can refer to a logical unit of the memory device used to store data. With some types of memory (e.g., NAND), pages can be grouped to form blocks.

Embodiments are not so limited, however, and the non-volatile memory device 124 can be based on any other type of non-volatile memory or storage device, such as such as, read-only memory (ROM), phase change memory (PCM), self-selecting memory, chalcogenide based memories, ferroelectric transistor random-access memory (FeTRAM), ferroelectric random access memory (FeRAM), magneto random access memory (MRAM), Spin Transfer Torque (STT), conductive bridging RAM (CBRAM), resistive random access memory (RRAM), oxide based RRAM (OxRAM), electrically erasable programmable read-only memory (EEPROM), NVRAM, ReRAM, FeRAM, "emerging" memory devices such as a ferroelectric RAM device that includes ferroelectric capacitors that can exhibit hysteresis characteristics, a 3-D Crosspoint (3D XP) memory device, etc., or combinations thereof.

As an example, a ferroelectric RAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

As another example, a 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation, where a non-volatile memory cell can be programmed without the non-volatile memory cell being previously erased. In contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

As shown in FIG. 1A, the memory sub-system 130 includes a connector 101. The connector 101 can comprise an interface and/or a bus that couples the memory sub-system 130 to a motherboard or backplane of a computing device, such as a laptop or other computing device. The connector 101 can include multiple pins (e.g., electrically conductive portions) that can allow for power to be provided to the memory sub-system 130 as indicated by the arrow labeled POWER 102 and/or can include multiple pins that can allow for data to be transferred to and from the memory sub-system 130 as indicated by the arrow labeled I/O 104. In some embodiments, the I/O 104 can be an input/output scheme that is CXL compliant and/or PCIe compliant. As described above, the connector 101 can have fewer pins than an aggregate quantity of pins on a front-end portion 103 of the memory sub-system 130 than a quantity of pins associated with connections to both a volatile memory device and a non-volatile memory device in some approaches.

As used herein, the terms "front-end," "front-end portion," and variants thereof, generally refer to components of the memory sub-system 130 that interface with circuitry external to the memory sub-system 130, while the terms "back-end," "back-end portions," and variants thereof generally refer to components of the memory sub-system 130 that are resident on the memory sub-system 130 and below the dashed line delineating the front-end 103 from the back-end 105. As used herein, the term "resident on" refers to something that is physically located on a particular component. For example, the control circuitry 106, the volatile memory device 114, and/or the non-volatile memory device 124 being "resident on" the memory sub-system 130 refers to a condition in which the hardware circuitry that comprises the control circuitry 106, the volatile memory device 114, and/or the non-volatile memory device 124 is physically located on the memory sub-system 130. The term "resident on" can be used interchangeably with other terms such as "deployed on" or "located on," herein.

The connector 101 can allow for the memory sub-system to be removably coupled to the backplane or the motherboard of a computing device such that the memory sub-system 130 can be easily removed or installed (e.g., "swapped" in or out) in such a computing device. In some embodiments, the connector 101 can be SATA Universal Storage Module™ type connector, although embodiments are not so limited. For example, the connector 101 can be any kind of interface or bus that allows for connection from a host bus adapter to a memory device and/or a storage device. Non-limiting examples of such interfaces or buses can include an advanced host controller interface (AHCI), a parallel advanced technology attachment (PATA), a serial advanced technology attachment (SATA), a slimline connector, or any other interface or bus that allows for connection of the memory sub-system 130 to external circuitry, such as a motherboard, backplane, and/or a host computing device/system.

As shown in FIG. 1A, the memory sub-system 130 includes control circuitry 106 that can be coupled to the connector 101. The control circuitry 106 can include various hardware components that are operable to perform operations described herein. For example, the control circuitry 106 can be configured to facilitate handling of commands or other instructions that are CXL compliant and/or PCIe compliant to facilitate performance of operations described herein. Stated alternatively, in some embodiments, in some embodiments, the control circuitry 106 can receive the write requests at a rate of thirty-two (32) gigatransfers per second or greater in accordance with a CXL protocol).

In some embodiments, the control circuitry 106 can be a microcontroller, special purpose logic circuitry (e.g., a field programmable gate array (FPGA), an application specific integrated circuit (ASIC), etc.), or other suitable processing device. In a non-limiting example, the control circuity 106 can be a CXL compliant controller that is provided as an ASIC, although embodiments are not so limited.

The control circuitry 106 can include one or more direct memory access (DMA) components that can receive data via the connector 101 as part of transferring such data to other components of the memory sub-system 130, as described herein. Conversely, in embodiments in which the control circuitry 106 includes one or more DMA components, the DMA components can receive data from components of the memory sub-system 130 (e.g., the volatile memory device 114, the HMB 116, and/or the non-volatile memory device 124) as part of transferring such data to circuitry external to the memory sub-system 130 via, for example, the I/O 104.

As shown in FIG. 1A, the control circuitry 106 includes a memory controller 108 and a storage controller 110. As shown in FIG. 1A, the memory controller 108 is coupled to the volatile memory via the communication path 112 while the storage controller 110 is coupled to the non-volatile memory controller 120 via the communication path 118. As used herein, the term "communication path," and variants thereof, generally refers to a physical connection (e.g., a wire, trace, conductive path, etc.) that can allow for transfer of information and/or data between components coupled thereto.

In some embodiments, the communication path 112 can be a DDR I/O communication path that allows for data and/or commands to be transferred between the control circuitry 106 and the volatile memory device 114 and/or the HMB 116. In some embodiments, data and/or commands can be transferred via the communication path 112 via a CXL.memory protocol. As used herein, a "CXL.memory protocol" (or "CXL.mem") is a protocol that enables a host computing device to access device-attached memory (e.g., the volatile memory device 114) using load/store commands. Although shown as a single communication path, the communication path 112 can comprise multiple communication paths (e.g., 2, 4, 6, 8, etc. physical communication paths or "channels").

In some embodiments, the communication path 118 can be a PCIe compliant interface such as PCIe 4.0, PCIe 5.0, etc. interface that allows for data and/or commands to be transferred to the non-volatile memory controller 120. In some embodiments, data and/or commands can be transferred via the communication path 118 via a CXL.io protocol. As used herein, a "CXL.io protocol" is generally functionally equivalent to a PCIe 5.0 protocol. Although shown as a single communication path, the communication path 118 can comprise multiple communication paths (e.g., 2, 4, 6, 8, etc. physical communication paths or "channels").

In some embodiments, the non-volatile memory controller 120 can be a media controller such as a non-volatile memory express (NVMe) controller. For example, the non-volatile memory controller 120 can be configured to perform operations such as copy, write, read, error correct, etc. for the non-volatile memory device 124. In addition, the non-volatile memory controller 120 can include special purpose circuitry and/or instructions to perform various operations described herein.

As shown in FIG. 1A, the non-volatile memory controller 120 is coupled to the non-volatile memory device 124 via a communication path 122. The non-volatile memory device 124 can receive data and/or commands from the non-volatile memory controller 120 via the communication path 122. In some embodiments, the communication path 122 can be an open NAND flash interface (ONFI) communication path, although embodiments are not so limited. In embodiments in which the communication path 122 is an ONFI communication path, the communication path 122 can be an ONFI 5.0 interface that supports communication at around 2,400 mega-transfers per second (MT/s) or greater. Although shown as a single communication path, the communication path 122 can comprise multiple communication paths (e.g., 2, 4, 6, 8, etc. physical communication paths or "channels").

Figure 1B:
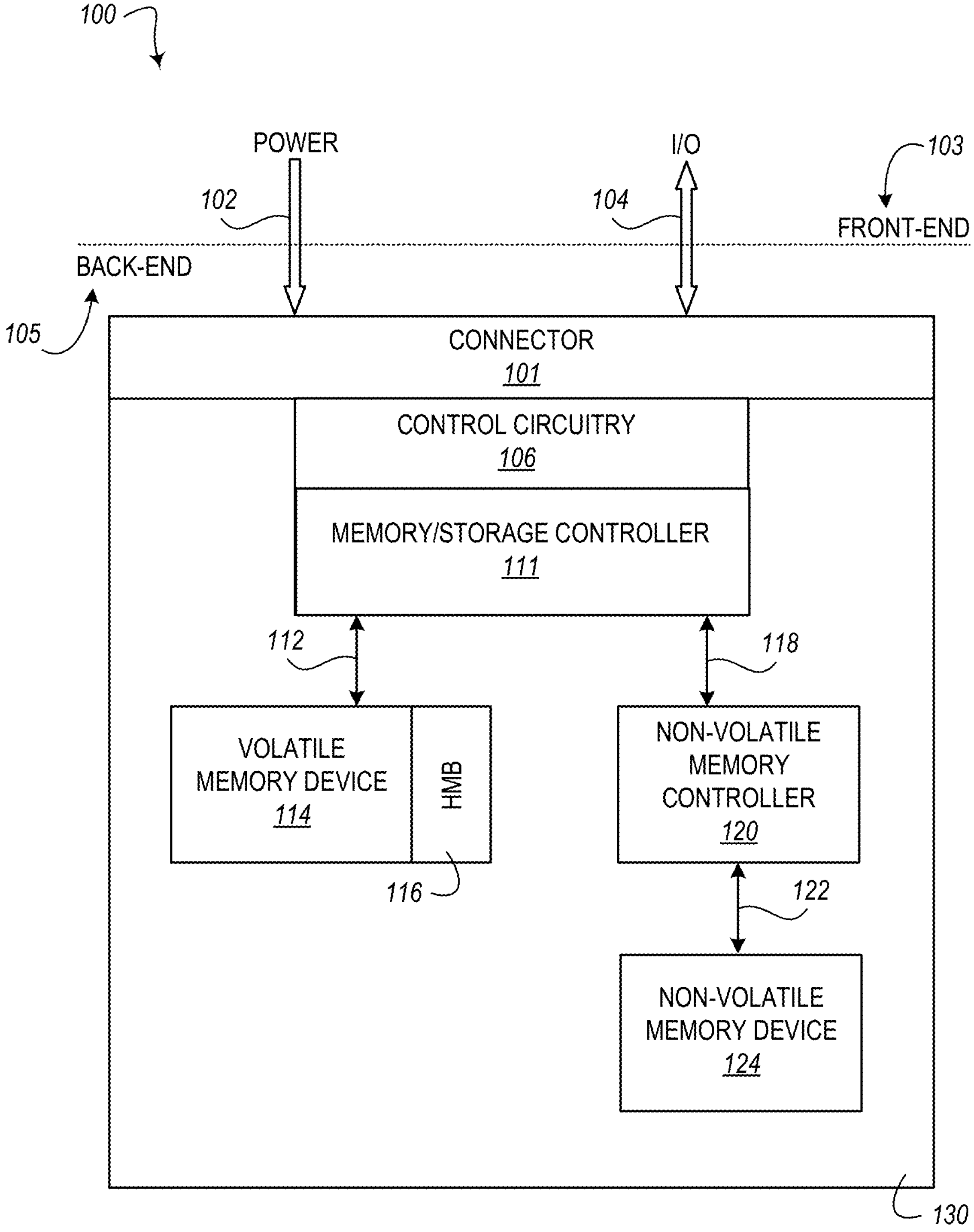
FIG. 1B illustrates another functional block diagram in the form of an apparatus including a memory sub-system that includes a connector, control circuitry, a volatile memory device, a non-volatile memory controller, and a non-volatile memory device in accordance with a number of embodiments of the present disclosure.

One or more Figures herein illustrate a memory sub-system and/or components of a memory sub-system in accordance with a number of embodiments of the present disclosure. For example, FIG. 1B illustrates another functional block diagram in the form of an apparatus 100 including a memory sub-system 130 that includes a connector 101, control circuitry 106, a volatile memory device 114, a non-volatile memory controller 120, and a non-volatile memory device 124 in accordance with a number of embodiments of the present disclosure.

In a non-limiting example, an apparatus 100 can include control circuitry 106, a non-volatile memory device 124, and a volatile memory device 114. The apparatus 100 can have a universal storage module form factor. The control circuitry 106 can receive a command presented according to a compute express link (CXL) protocol and cause data to be written to the non-volatile memory device or the volatile memory device, or both, in response to receipt of the command while refraining from writing the data to a cache that is external to the apparatus. The cache that is external to the apparatus 100 can be a host memory 224 or other cache provided on a host computing device 240. Embodiments are not so limited, however, and the cache that is external to the apparatus 100 can be a cache that is not provided on a package that contains the apparatus 100 but is also not resident on a host computing device 240.

In some embodiments, the control circuitry 106 further comprises a universal serial bus interface (such as the interface 101) configured to allow for data to be extracted from the non-volatile memory device 124 or the volatile memory device 114, or both. This feature can be utilized in the event that data written to and/or stored by the apparatus 100 needs to be retrieved and/or recovered due to some failure involving the host computing system 240 or other circuitry provided in a computing system in which the apparatus 100 is deployed. This can allow for the apparatus 100 and, hence, the non-volatile memory device 124 and the volatile memory device 114 to be resident on a single substrate that is removably couplable to a host system 240 or a motherboard, or both.

The control circuit 106 can includes a direct memory access (DMA) component configured to receive the command from a host device 240. Further, as mentioned herein, the control circuitry 106 can be provided as an application-specific integrated circuit, field-programmable gate array, or other hardware device.

Continuing with this non-limiting example, the apparatus 100 can further include a random access memory (RAM) device coupled to the non-volatile memory device 124 and the volatile memory device 114 via a dedicated datapath 226, wherein the RAM is configured to offload data transfers between the non-volatile memory device 124 and the volatile memory device 114, as described herein.

The control circuitry 106 can a first controller 108 configured to operate according to the CXL protocol, a second controller 110/120 configured to operate according to a non-volatile memory express protocol, and a third controller configured to operate according to a dual data rate protocol. Accordingly, in some embodiments, the control circuitry 106 comprises a first controller 108 configured to exchange CXL.mem commands with the volatile memory device 114 and a second controller 110 configured to exchange CXL.io commands with the non-volatile memory device 124.

As shown in FIG. 1B, the storage controller and the memory controller are provided as a single "merged" device—the memory/storage controller 111. In such embodiments, the memory/storage controller 111 can perform both the functionality of the memory controller 108 of FIG. 1A and the memory controller 110 of FIG. 1A. This may allow for a reduction in the footprint of the memory/storage controller 111 in comparison to the embodiment illustrated in FIG. 1A. For example, by merging the circuitry required for the memory controller and the storage controller to a single chip (e.g., ASIC, FPGA, etc.), the memory/storage controller 111 may require less physical space on the logic circuitry 106 than in embodiments in which the memory controller and the storage controller are provided as separate circuits.

One or more Figures herein illustrate a memory sub-system and/or components of a memory sub-system in accordance with a number of embodiments of the present disclosure. For example, FIG. 2 illustrates a functional block diagram in the form of a system 241 including a host computing device 240 and a memory sub-system 230 in accordance with a number of embodiments of the present disclosure. As shown in FIG. 2, the memory sub-system 230 is coupled to the host computing device 240 via an I/O interface 204. The memory sub-system includes a connector 201, control circuitry 206, which includes a memory controller 208 and a storage controller 210. The storage controller 210 is coupled to a non-volatile memory controller 220 via a communication path 218 and the non-volatile memory controller 220 is coupled to a non-volatile memory device 224 via a communication path 222. The memory controller 208 is coupled to a volatile memory device 214 via a communication path 212. As shown in FIG. 2, the volatile memory device 214 includes, or is coupled to, a host memory buffer (HMB) 216. Although shown as being physically distinct from the storage controller 210, the non-volatile memory controller 220 can, in some embodiments, be physically integrated with the storage controller 210 and/or can be provided in lieu of the storage controller 210. In yet other embodiments, the storage controller 210 can be provided in lieu of the non-volatile memory controller 220.

The memory sub-system 230, the connector 201, the control circuitry 206, the memory controller 208, the storage controller 210, the volatile memory device 214, the HMB 216, the non-volatile memory controller 220, and the non-volatile memory device 224 can be analogous to the memory sub-system 130, the connector 101, the control circuitry 106, the memory controller 108, the storage controller 110, the volatile memory device 114, the cache 116, the non-volatile memory controller 120, and the non-volatile memory device 124 illustrated in FIG. 1, herein. Similarly, the I/O interface 204 and the respective communication paths 212, 218, and 220 can be analogous to the I/O 101 and the respective communication paths 112, 118, and 120 illustrated in FIG. 1, herein.

In some embodiments, the volatile memory device 214 and the non-volatile memory device 224 are coupled via an internal datapath 226. As described in more detail, herein, the internal datapath 226 can be configured to offload data transfers between the volatile memory device 214 and the non-volatile memory device 224 such that at least some data is transferred between the volatile memory device 214 and the non-volatile memory device 224 without encumbering the host computing device 240 (e.g., without transferring such data to the host computing device 240).

As shown in FIG. 2, the host computing device 240 includes a central processing unit (CPU) 242. The CPU 242 can be configured to execute an operating system for the host computing device 240, in addition to performing various operations and executing various instructions to cause the host computing device 240 to function.

In some embodiments, the host computing device 240 can be a mobile computing device, such as a laptop computer, a tablet, a convertible laptop tablet, a phablet, a smartphone, etc. Embodiments are not so limited; however, and the host computing device 240 can be a host system such as a desktop computer, a digital camera, a smart phone, a memory card reader, and/or internet-of-thing enabled device, among various other types of hosts, and can include a memory access device, e.g., a processor (or processing device). One of ordinary skill in the art will appreciate that "a processor" can intend one or more processors, such as a parallel processing system, a number of coprocessors, etc.

As illustrated in FIG. 2, the host computing device 240 can be coupled to the memory sub-system 230 via an interface 204. The interface 204 can be any type of communication path, bus, or the like that allows for information to be transferred between the host computing device 240 and the memory sub-system 230. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. However, in at least one embodiment, the interface 204 is a PCIe 5.0 interface that is compliant with the compute express link (CXL) protocol standard. Accordingly, in some embodiments, the interface 204 can support transfer speeds of at least 32 gigatransfers per second.

In some embodiments, the interface 204 can be configured such that signaling can be selectively transferred via the interface 204 according to multiple protocols. For example, signaling can be selectively transferred via the interface 204 according to a cache protocol in which data is transferred between a host and the memory sub-system 230 and a memory protocol in which data is transferred between a host and the volatile memory device 214 and/or the non-volatile memory device 224. In some embodiments, the cache protocol can be invoked to efficiently cache data associated with the host memory 244 according to a request and response approach. In contrast, the memory protocol can be invoked to provide access to the volatile memory device 214 and/or the non-volatile memory device 224 by the host using read/write command with the host processor (e.g., the CPU 242) acting as a master device and the volatile memory device 214 and/or the non-volatile memory device 224 acting as a subordinate device.

The host computing device 240 can include a system motherboard and/or backplane and can include a number of processing resources (e.g., one or more processors, microprocessors, or some other type of controlling circuitry). The system 241 can include separate integrated circuits or the host computing device 240, the memory sub-system 230, the connector 201, the control circuitry 206, the memory controller 208, the storage controller 210, the volatile memory device 214, the HMB 216, the non-volatile memory controller 220, and the non-volatile memory device 224 can be on the same integrated circuit. The system 241 can be, for instance, a server system and/or a high-performance computing (HPC) system and/or a portion thereof. Although the example shown in FIG. 2 illustrate a system having a Von Neumann architecture, embodiments of the present disclosure can be implemented in non-Von Neumann architectures, which may not include one or more components (e.g., CPU, ALU, etc.) often associated with a Von Neumann architecture.

The embodiment of FIG. 2 can include additional circuitry that is not illustrated so as not to obscure embodiments of the present disclosure. For example, the memory sub-system 240 can include address circuitry to latch address signals provided over I/O connections through I/O circuitry. Address signals can be received and decoded by a row decoder and a column decoder to access the volatile memory device 214 and/or the non-volatile memory device 224. It will be appreciated by those skilled in the art that the number of address input connections can depend on the density and architecture of the volatile memory device 214 and/or the non-volatile memory device 224.

In some embodiments, the control circuitry 106/206 can receive and/or process commands associated with a CXL.memory protocol simultaneously with receiving and/or process commands associated with a CXL.io protocol. For example, the control circuitry can receive and/or process signaling indicative of a CXL.memory and/or CXL.io memory access via a communication path (e.g., the communication path 104/204 illustrated in FIG. 1 and FIG. 2, herein) to control operations involving the volatile memory device 114/214 and/or the non-volatile memory device 124/224 illustrated in FIGS. 1 and 2.

In a non-limiting example, the control circuitry 106/206/ etc. can receive and/or process commands that are directed to the memory controller 108/208 and the storage controller 110/210 simultaneously and/or contemporaneously such that said receipt and/or processing of commands occurs, at minimum, substantially simultaneously and/or substantially contemporaneously. As used herein, the term "substantially" intends that the characteristic need not be absolute, but is close enough so as to achieve the advantages of the characteristic. For example, "substantially simultaneously" or "substantially concurrently" are not limited to operations that are performed absolutely concurrently and can include timings that are intended to be concurrent and/or simultaneous but, due to manufacturing limitations or the like, may not be precisely concurrent or simultaneous. For example, due to read/write delays that may be exhibited by various interfaces and/or buses, receipt and/or processing of commands that are directed to the memory controller 108/208 and the storage controller 110/210 that are performed "substantially simultaneously" or "substantially concurrently" may not start or finish at exactly the same time.

In some embodiments, an internal datapath (e.g., the internal data path 226 illustrated in one or more Figures, herein) can couple a volatile memory device (e.g., the volatile memory device 214 illustrated in one or more Figures, herein) and a non-volatile memory device (e.g., the non-volatile memory device 224 illustrated in one or more Figures, herein). The internal datapath can be configured to transfer data directly between the volatile memory device and the non-volatile memory device. That is, in some embodiments, the internal datapath can be configured to allow for data to be transferred between the volatile memory device and the non-volatile memory device such that at least some of the data is transferred between the volatile memory device and the non-volatile memory device without encumbering a host computing device (e.g., without transferring such data to the host computing device), such as the host computing device 240 illustrated in one or more Figures, herein.

In some embodiments, a memory sub-system (e.g., the memory sub-system 130 illustrated in FIGS. 1A and 1B and/or the memory sub-system 230 illustrated in FIG. 2), and/or the constituent components thereof, can be provided as a universal storage media (USM) device. In embodiments in which the memory sub-system and/or the components thereof are provided as a USM device, the USM device can operate according to a CXL protocol. This can, in some embodiments, provide improved signal integrity in comparison to standard memory devices that are generally provided having a M.2 form factor, an M.3 form factor, and/or a NVDIMM for factor, as described above.

In addition to allowing for the amount of space consumed by such components within a computing device to be reduced in comparison to some approaches, such embodiments can further allow for a reduction in thermal characteristics exhibited by some traditional approaches while providing adequate memory, storage, computational efficiency, and/or data throughput in computing devices, such as mobile computing devices. For example, some embodiments can allow for utilization of a USM connector to provide improved speeds and/or increased bandwidth than other conventional connectors.

In some embodiments, utilization of a non-volatile memory controller (e.g., the non-volatile memory controller 120 illustrated in FIGS. 1A and 1B and/or the non-volatile memory controller 220 illustrated in FIG. 2) that is resident on a memory sub-system (e.g., the memory sub-system 130 illustrated in FIGS. 1A and 1B and/or the memory sub-system 230 illustrated in FIG. 2) can reduce or eliminate power consumption of a dedicated PCIe interface to a non-volatile memory device (e.g., the non-volatile memory device 124 illustrated in FIGS. 1A and 1B and/or the non-volatile memory device 224 illustrated in FIG. 2) prevalent in some approaches. For example, by utilizing a shared interface (e.g., a shared communication path, such as the communication path 104 illustrated in FIGS. 1A and 1B and/or the communication path 204 illustrated in FIG. 2) between external circuitry (e.g., the host computing device 240 illustrated in FIG. 2) and the memory sub-system, a dedicated PCIe interface may not be necessary, thereby reducing or eliminating power consumption associated with a PCIe interface utilized in some approaches.

For example, in some embodiments, the communication path(s) 104/204 described herein can operate according to an ONFI protocol as described above. This may reduce the amount of power consumed in data transfer between the memory sub-system and the host computing device and/or provide faster communication speeds (e.g., higher bandwidth) between a memory controller (e.g., the memory controller 108 illustrated in FIG. 1A and/or the memory controller 208 illustrated in FIG. 2) and/or a merged controller (e.g., the memory/storage controller 111 illustrated in FIG. 1B). Further, operating the communication paths described herein according to an ONFI protocol can provide improved data transfer speeds between the memory controller(s) and the memory devices coupled thereto in comparison to some approaches.

In some embodiments, at least a portion of a volatile memory device (e.g., the volatile memory device 114 illustrated in FIGS. 1A and 1B and/or the volatile memory device 214 illustrated in FIG. 2) and/or at least a portion of a cache (e.g., the cache 116 illustrated in FIGS. 1A and 1B and/or the HMB 216 illustrated in FIG. 2) can be allocated for use in operations involving management of a non-volatile memory device (e.g., the non-volatile memory device 224 illustrated in FIGS. 1A and 1B and/or the non-volatile memory device 224 illustrated in FIG. 2).

For example, in some embodiments, flash translation layer (FTL) operations can be partially or fully offloaded to the volatile memory device and/or the cache of the memory sub-system (e.g., the memory sub-system 130 illustrated in FIGS. 1A and 1B and/or the memory subsystem 230 illustrated in FIG. 2) described above. As will be appreciated, the FTL generally refers to a layer below the file system that maps host side or file system logical block addresses (LBAs) to the physical address (PBAs) (e.g., logical-to-physical (L2P) mapping) of a non-volatile memory device, such as a flash memory device.

Embodiments are not so limited however, and, in some embodiments, other processes and/or operations generally performed by a non-volatile memory device and/or a non-volatile memory controller (e.g., the non-volatile memory controller 120 illustrated in FIGS. 1A and 1B and/or the non-volatile memory controller 220 illustrated in FIG. 2) can be allocated to the volatile memory device and/or the cache(s) described herein.

In some embodiments, the allocation of such processes and/or operations can be performed in response to receipt of a particular command, such as a vendor unique (VU) command. As used herein, the term "vendor unique command" or, in the alternative "vendor specific command" generally refers to signaling provided in the form of a command that is not generally available to the general public and instead, is accessible, programmable, and/or executable only by a particular entity. It will however be appreciated that the allocation of such processes and/or operations can be performed in response to receipt of a particular command that is not a "vendor unique command" or a "vendor specific command."

In some embodiments, aspects of the FTL can be controlled and/or re-configured during runtime of a memory sub-system to adjust resource demands (e.g., memory, storage, and/or processing resource demands) associated with the FTL. As an example, a memory sub-system (e.g., the memory sub-system 130 illustrated in FIGS. 1A and 1B and/or the memory subsystem 230 illustrated in FIG. 2) can be configured to, in conjunction with the FTL, allocate and/or re-allocate resources corresponding to performance of operations associated with the FTL based on workloads performed by the memory sub-system and/or a host computing device coupled to the memory sub-system and/or "randomness" of memory accesses incurred by the memory sub-system, among others.

As used herein, the term "workload," as well as derivatives thereof, generally refers to an amount of processing available to components of a computing device at a given time. A "workload" may also refer to an application running on a computing device in connection with and amount of computing resources (e.g., memory resources, storage resources, and/or processing resources) utilized in execution of the application. As used herein, "randomness" generally refers to whether data written to a memory device (either a volatile memory device or a non-volatile memory device, or both) is sequential data or non-sequential data. Sequential data is generally characterized as being written to sequential physical locations in a group of memory cells and/or a memory array. Non-sequential data or "random data," is generally characterized as data being written to non-sequential physical locations in a group of memory cells and/or a memory array of a memory device.

For example, under some operating conditions, a greater quantity of local accesses (e.g., memory access requests that do not invoke a host computing device) may be detected based on workloads and/or the "randomness" of such workloads. In some embodiments, the memory sub-system and/or the FTL can allocate and/or re-allocate computing resources to attempt to optimize performance of the memory sub-system and/or a computing device in which the memory sub-system is deployed. As a result, in at least one embodiment, a host computing device may not access a cache (e.g., the HMB 116 illustrated in FIG. 1A and FIG. 1B and/or the HMB 216 illustrated in FIG. 2A and FIG. 2B) via a PCIe interface.

Further, in at least one embodiment in which a cache is a portion of a volatile memory device (e.g., the volatile memory device 114 illustrated in FIG. 1A and FIG. 1B and/or the volatile memory device 214 illustrated in FIG. 2A and FIG. 2B), the amount of memory space allocated to the volatile memory device and the cache can be altered to provision either the volatile memory device or the cache with additional physical memory locations for use by the FTL based on the workloads and/or randomness of such workloads incurred by the FTL and/or the memory sub-system.

In other embodiments, if RAM utilization permits, we can use more of it to reduce the "swapping" of the FTL from NAND. In client workloads typically a subset of the entire drive is being accessed in time, so a part of the entire FTL can be cached in RAM. In Host Memory Buffer (HMB) implementations associated with conventional approaches to get a "DRAMless drive," a small (64 MB) portion of host memory can be allocated to store this piece of the FTL. In such approaches, the portion of the FTL that is cached in the host memory is accessed over PCIE bus out to the host memory. In contrast, embodiments herein allow for the DRAM controller to essentially be local to the NAND and no I/O across PCIE is needed. Accordingly, embodiments herein can dynamically adjust the amount of FTL based on the workload, especially when a protocol to request more of the memory from the host is utilized.

In some approaches, when a mobile computing device (e.g., a laptop) can be closed and the goal is to save off the DRAM contents to NAND in a big write. In contrast, in some embodiments described herein, the host issues a Vendor Unique command to the CXL controller to move the DRAM image to a swap space on the disk (e.g., as part of a hibernation operation performed by the mobile computing device. In such embodiments, the host CPU does not have to manage the transfer, so the controller can move the data rapidly. Likewise, when the mobile computing device resumes, the image can be quickly restored from NAND to DRAM for an extremely fast return. In some embodiments, the DRAM can be powered off completely in suspend mode as the contents same to NAND.

In some embodiments, a portion of the volatile memory device (e.g., the volatile memory device 114 illustrated in FIG. 1A and FIG. 1B and/or the volatile memory device 214 illustrated in FIG. 2) and/or the non-volatile memory device (e.g., the non-volatile memory device 124 illustrated in FIG. 1A and FIG. 1B and/or the non-volatile memory device 224 illustrated in FIG. 2) can be configured to cache host data that is transferred to the memory sub-system according to a CXL.io protocol. In embodiments in which a portion of the non-volatile memory device is configured to cache such data, the portion can constitute a portion of the non-volatile memory device that includes single level cells (SLCs). Embodiments are not do limited, however and in some embodiments, the portion of the non-volatile memory device configured to cache such data can constitute a portion of the non-volatile memory device that includes multi-level cells (MLCs), triple level cells (TLCs), quad-level cells (QLCs), and/or penta-level cells (PLCs), etc.

In some embodiments, configuring a portion of the volatile memory and/or configuring a portion (e.g., a SLC portion) of the non-volatile memory device as a cache for host data can allow for an improvement in burst write speed to the non-volatile memory (e.g., to MLC, TLC, QLC, and/or PLC portions of the memory) by having the data prefetched into the cache and by utilizing the CXL.io protocol.

In some embodiments, one or more additional CXL.memory communication paths ("channels") can be provided to the memory sub-system than are provided in other approaches. These additional CXL.memory communication paths can allow a host computing device to be coupled to one or more additional memory sub-systems and/or to one or more additional memory devices than illustrated in FIGS. 1A, 1B, and 2, herein. In some embodiments, such additional CXL.memory communication paths can couple a memory controller (e.g., the memory controller 108/208 illustrated in FIGS. 1A and 2 and/or the memory/storage controller 111 illustrated in FIG. 1B, herein) to a memory device (e.g., a volatile memory device) of the memory sub-system. Embodiments are not so limited, however, and in some embodiments, the one or more additional CXL.memory communication paths can couple a host computing device to a different memory sub-system in a similar fashion as the communication path 204 illustrated in FIG. 2 couples the host computing device to the memory sub-system.

In some embodiments, the CXL protocol makes the DRAM part of the CPUs memory space. In such embodiments, the onboard DRAM that may be mounted on the CPU die module can be small and is expanded with the DRAM present in the memory sub-system(s) described herein (albeit with longer latency).

As described above, a memory sub-system (e.g., the memory sub-system 130 illustrated in FIG. 1A and FIG. 1B and/or the memory sub-system 230 illustrated in FIG. 2) can include volatile memory device(s) (e.g., the volatile memory device 114 illustrated in FIG. 1A and FIG. 1B and/or the volatile memory device 214 illustrated in FIG. 2) and non-volatile memory device(s) (e.g., the non-volatile memory device 124 illustrated in FIG. 1A and FIG. 1B and/or the non-volatile memory device 224 illustrated in FIG. 2). In such embodiments, data movement throughout the memory sub-system and/or a computing device in which the memory sub-system is deployed can be offloaded from a host computing device (e.g., the host computing device 240 illustrated in FIG. 2) to the memory sub-system. This can alleviate at least a portion of operations involving data, such as memory accesses, computational operations, etc. that may be performed by the host computing device in some approaches, thereby reducing a quantity of data transfers between the host computing device and the memory sub-system, which can reduce an amount of time and/or power consumed in performance of such operations.

For example, because the memory sub-system described herein can include circuitry (e.g., the control circuitry and/or constitute components thereof) that can coordinate and/or perform operations that are performed by a host computing device in some approaches, embodiments herein allow for at least a portion of operations performed by a host computing device in some approaches (e.g., data movement operations, etc.) to be offloaded to the memory sub-system. As described above, this can allow for a reduction in resources consumed by the host computing device and can therefore improve the overall functioning of a computing device, such as a mobile computing device.

In some embodiments, the memory sub-system can include an internal cache configured as a look-ahead cache for the memory sub-system. In some embodiments, the look-ahead cache can operate in the absence of utilization of an interface or bus associated with the host computing device. For example, the look-ahead cache can operate internally to the memory sub-system without placing data written to the look-ahead cache on an interface or bus associated with the host computing device.

In some embodiments, the look-ahead cache can prefetch data that is to be written to a non-volatile memory device prior to the data being written to the non-volatile memory device. This can allow for data transfer speeds to be increased in comparison to approaches that do not employ such a look-ahead cache because the data to be written to the non-volatile memory device can be ready for writing as soon as the non-volatile memory device requests the data.

In some embodiments, the memory sub-system can include a universal serial bus (USB) connection that can allow for the memory sub-system to coupled to a different memory sub-system or memory device to transfer data between the memory sub-system and the different memory sub-system or memory device. This can allow for contents of the memory sub-system to be efficiently backed up and/or can allow for the contents of the memory sub-system to be transferred to a different memory sub-system as part of upgrading or replacing the memory sub-system.

In some embodiments, the memory sub-system (e.g., the control circuitry 106 illustrated in FIGS. 1A and 1B and/or the control circuitry illustrated in FIG. 2) can perform operations to compress and/or decompress data written to or read from the volatile memory device and/or the non-volatile memory device. For example, the control circuity can receive data from a host computing device and compress the data to save space within the volatile memory device and/or the non-volatile memory device prior to transferring the compressed data to the volatile memory device and/or the non-volatile memory device. The control circuitry can, when the data is requested by the host computing device, intercept the compressed data and perform an operation using the data to decompress the data prior to transferring the decompressed data to the host computing device. In some embodiments, the data can be decompressed in response to a restore operation performed using a mobile computing device.

In some embodiments, the control circuitry can compress the data and write the compressed data to the volatile memory device. This can allow for an image size associated with the volatile memory device to be reduced in comparison to approaches that do not utilize data compression techniques initiated by control circuitry prior to writing the data to the volatile memory device. For example, during performance of a suspend operation, data may be transferred (e.g., "flushed") from the volatile memory device to the non-volatile memory device. By compressing the data prior to writing the data to the volatile memory device, the image size to be flushed from the volatile memory device to the non-volatile memory device can be reduced thereby decreasing an amount of time required to flush the data to the non-volatile memory device. When a subsequent resume operation is performed, the control circuitry can decompress the data as needed.

In some embodiments, the memory sub-system (e.g., the control circuitry 106 illustrated in FIGS. 1A and 1B and/or the control circuitry illustrated in FIG. 2) can perform operations to dynamically allocate bandwidth associated with host traffic (e.g., traffic associated with the front end 103 illustrated in FIGS. 1A and 1B) between the volatile memory device and the non-volatile memory device on the back end (e.g., the back end 105 illustrated in FIGS. 1A and 1B).

In some embodiments, this dynamic allocation of bandwidth can be performed based on an application type and/or can be based on an amount of host traffic being processed. For example, because some application types can benefit from faster processing and/or because some application types can be associated with random or non-random data patterns, it can be beneficial to dynamically direct data from different application types to the volatile memory device or the non-volatile memory device. Further, in order to efficiently allocate data traffic associated with the host, it can be beneficial to dynamically choose whether data is written to the volatile memory device, or the non-volatile memory device based on current host data traffic patterns.

In some embodiments, the memory sub-system can be configured to determine that a power failure has occurred involving the computing system in which the memory sub-system is deployed and/or a power failure has occurred involving the memory sub-system itself. In such embodiments, the memory sub-system (e.g., the control circuitry 106 illustrated in FIGS. 1A and 1B and/or the control circuitry illustrated in FIG. 2) can transfer data from the volatile memory device to the non-volatile memory device to retain the data during the power failure.

In some embodiments, the data can be transferred from the volatile memory device directly to the non-volatile memory device via an internal data path (e.g., the internal data path 226 illustrated in FIG. 2). In general, the memory sub-system is provided with a finite amount of backup power in order to perform such operations. However, the amount of time available while the backup power is available can be limited. Accordingly, it can be beneficial to transfer the data from the volatile memory device to the non-volatile memory device via the internal data path in order to move the data as quickly as possible before the expiration of the backup power.

Further, in some embodiments, the data can be transferred from the volatile memory device directly to the non-volatile memory device in response to the power failure in the absence of intervention from a host computing device. That is, the circuitry of the memory sub-system can be configured to perform operations to transfer the data from the volatile memory device directly to the non-volatile memory device in the absence of receipt of a host computing device command or instruction.

Once power has been restored to the computing device and/or to the memory sub-system, the memory sub-system can be configured to transfer the data from the non-volatile memory device directly to the volatile memory device. In such embodiments, the memory sub-system can be configured to transfer the data from the non-volatile memory device directly to the volatile memory device in the absence of receipt of a host computing device command or instruction.

In a non-limiting example, a system (e.g., the apparatus/system 230/241) can be a universal storage module (USM) form factor package that includes control circuitry 206, a non-volatile memory device 224, and a volatile memory device 214. In this example, the control circuitry 206 can receive a command presented according to a compute express link (CXL) protocol and determine whether the command is a CXL.mem command or a CXL.io command. In response a determination that the command is a CXL.mem command, cause data to be written to the volatile memory device 214 while refraining from writing the data to a cache that is external to the USM form factor package, or, in response to a determination that the command is a CXL.io command, cause data to be written to the non-volatile memory device 224 while refraining from writing the data to a cache that is external to the USM form factor package.

As mentioned above, in some embodiments, the control circuitry includes a universal serial bus interface configured to allow for data to be extracted from the non-volatile memory device 224 or the volatile memory device 214, or both. In addition, the system can, in come embodiments, include a random access memory (RAM) device coupled to the non-volatile memory device 224 and the volatile memory device 214 via a dedicated datapath 226, wherein the RAM is configured to offload data transfers between the non-volatile memory device 224 and the volatile memory device 214.

Continuing with this non-limiting example, the control circuitry 206 can include a first controller 208 configured to exchange the CXL.mem command with the volatile memory device 214 and a second controller 210 configured to exchange the CXL.io command with the non-volatile memory device 224. Further, the control circuitry 206 can include a third controller configured to operate according to a dual data rate protocol. The control circuitry 206 can also include a direct memory access (DMA) component configured to receive the command from a host device 240 and/or a universal serial bus interface configured to allow for data to be extracted from the non-volatile memory device 224 or the volatile memory device 214, or both.

Figure 2A:
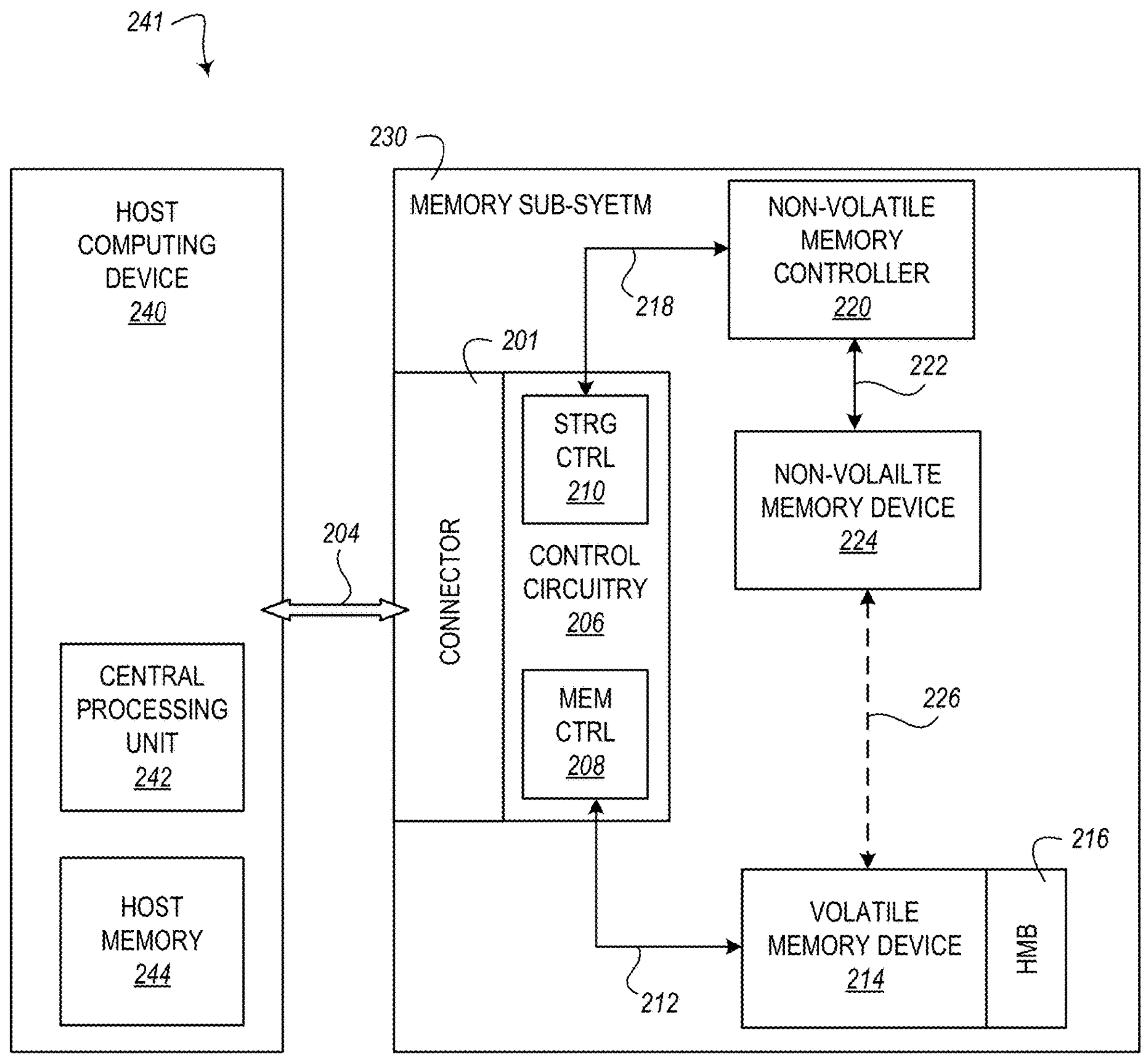
FIG. 2A illustrates a functional block diagram in the form of a system including a host computing device and a memory sub-system in accordance with a number of embodiments of the present disclosure.
Figure 2B:
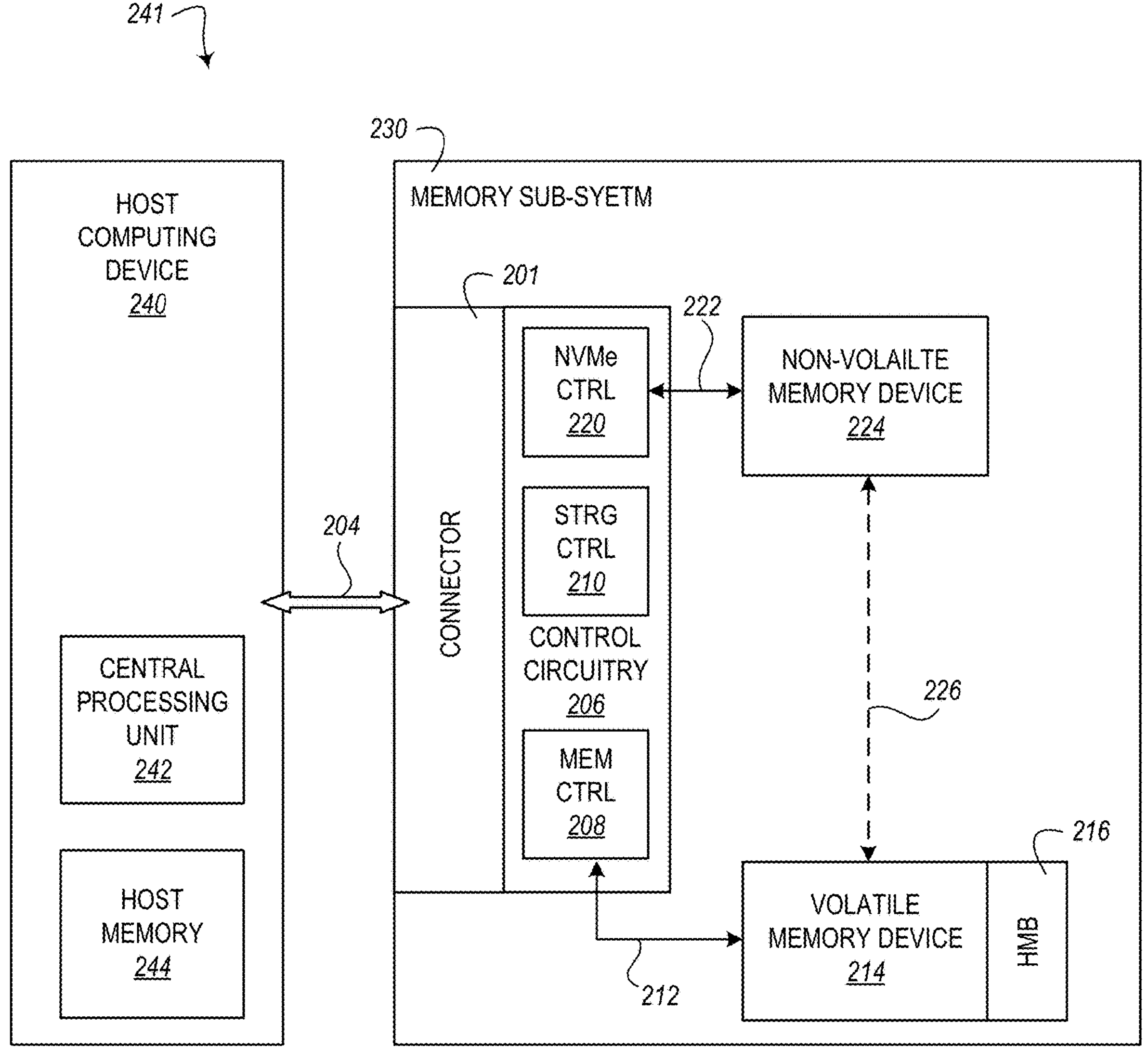
FIG. 2B illustrates another functional block diagram in the form of a system including a host computing device and a memory sub-system in accordance with a number of embodiments of the present disclosure.

FIG. 2B illustrates another functional block diagram in the form of a system including a host computing device and a memory sub-system in accordance with a number of embodiments of the present disclosure. The components illustrated in FIG. 2B are generally analogous to those illustrated in FIG. 2A, however, in the embodiment of FIG. 2B, the control circuitry 206, the memory controller 208, the storage controller 210, and the non-volatile memory controller 220 are physically integrated as a single block of controllers. Accordingly, control over the memory sub-system is handled by what is presented to the non-volatile memory device 224 and the volatile memory device 214 as a single controller in the embodiment of FIG. 2B.

It is noted that embodiments are not limited to those illustrated in FIG. 2A and FIG. 2B with respect to the physical integration of the controllers 206, 208, 210, and 220. For example, embodiments are contemplated in which the control circuity 206 and the memory controller 208 are physically integrated, the control circuitry 206 and the storage controller 210 are physically integrated, the control circuity 206, the memory controller 208, and the storage controller 210 are physically integrated, the control circuitry 206 and the non-volatile memory controller 220 are physically integrated, etc.

FIG. 3 is a flow diagram corresponding to a method 350 for a Compute Express Link memory and storage module in accordance with some embodiments of the present disclosure. The method 350 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 352, the method 350 includes receiving a command targeting a memory system 100 that includes a non-volatile memory device 124 and a volatile memory device 114, wherein the command is presented according to a compute express link (CXL) protocol. In some embodiments, the method 350 includes receiving the command targeting the memory system 100 via control circuitry 106 that comprises a memory controller 108 and a storage controller 110 that are resident on the control circuitry 106, as described above.

At operation 354, the method 350 includes causing data to be written to the non-volatile memory device 124 or the volatile memory device 114, or both, in response to receipt of the command while refraining from writing the data to a cache 244 that is external to the memory system 100.

The method 350 can further include receiving CXL.mem commands by a first portion (e.g., the memory controller 108) of control circuitry 106 resident on the memory system 100 and receiving CXL.io commands by a second portion (e.g., the storage controller 110) of control circuitry 106 resident on the memory system 100. In such embodiments, the method 350 can further include executing the CXL.mem commands by the first portion of the control circuitry 106 resident on the memory system 100 to access the volatile memory device 114 and executing the CXL.io commands by the second portion of the control circuitry 106 resident on the memory system 100 to access the non-volatile memory device 124.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a non-volatile memory device;
a volatile memory device; and
control circuitry configured to:
cause data to be written only to the non-volatile memory device in response to a command being a first type of protocol; and
cause the data to be written only to the volatile memory device in response to the command being a second type of protocol.

2. The apparatus of claim 1, wherein the control circuitry comprises a universal serial bus interface configured to allow for data to be extracted from the non-volatile memory device or the volatile memory device, or both.

3. The apparatus of claim 1, wherein the non-volatile memory device and the volatile memory device are resident on a single substrate that is removably couplable to a host device or a motherboard, or both.

4. The apparatus of claim 1, further comprising a random access memory (RAM) device coupled to the non-volatile memory device and the volatile memory device via a dedicated data path, wherein the RAM is configured to offload data transfers between the non-volatile memory device and the volatile memory device.

5. The apparatus of claim 1, wherein the control circuitry comprises a first controller configured to operate according to a CXL protocol, a second controller configured to operate according to a non-volatile memory express protocol, and a third controller configured to operate according to a dual data rate protocol.

6. The apparatus of claim 1, wherein the control circuitry comprises a first controller configured to exchange CXL.mem commands with the volatile memory device and a second controller configured to exchange CXL.io commands with the non-volatile memory device.

7. The apparatus of claim 1, wherein the apparatus has a universal storage module form factor.

8. The apparatus of claim 1, wherein the control circuitry further includes a direct memory access (DMA) component configured to receive the command from a host device.

9. The apparatus of claim 1, wherein the control circuitry comprises an application-specific integrated circuit.

10. The apparatus of claim 1, wherein the control circuitry further includes a direct memory access (DMA) component configured to receive the command from a host device.

11. The apparatus of claim 1, wherein the control circuitry comprises a memory controller and a storage controller that are resident on the control circuitry.

12. A method, comprising:
determining a type of protocol of a first received command and a second received command;
causing data to be written only to a non-volatile memory device in response to the first received command being a first type of protocol while refraining from writing the data to a cache; and
causing data to be written only to a volatile memory device in response to the second received command being a second type of protocol while refraining from writing the data to the cache.

13. The method of claim 12, further comprising:
executing CXL.mem commands by a first portion of control circuitry resident on a memory system to access the volatile memory device; and
executing CXL.io commands by a second portion of the control circuitry resident on the memory system to access the non-volatile memory device.

14. The method of claim 13, further comprising receiving the first or second command targeting the memory system via control circuitry that comprises a memory controller and a storage controller that are resident on the control circuitry.

15. The method of claim 14, extracting data from the non-volatile memory device or the volatile memory device, or both.

16. The method of claim 13, further comprising:
receiving the CXL.mem commands by the first portion of control circuitry resident on the memory system; and
receiving the CXL.io commands by the second portion of control circuitry resident on the memory system.

17. A system, comprising:
a universal storage module (USM) form factor package that includes:
control circuitry;
a non-volatile memory device; and
a volatile memory device, wherein the control circuitry is configured to:
cause data to be written only to the volatile memory device in response to a determination that a received command is a first type of protocol, and
cause the data to be written only to the non-volatile memory device in response to a determination that the command is a second type of protocol.

18. The system of claim 17, wherein the control circuitry comprises a first controller configured to exchange a CXL.mem command with the volatile memory device and a second controller configured to exchange a CXL.io command with the non-volatile memory device and a third controller configured to operate according to a dual data rate protocol.

19. The system of claim 17, further comprising a random access memory (RAM) device coupled to the non-volatile memory device and the volatile memory device via a dedicated data path, wherein the RAM is configured to offload data transfers between the non-volatile memory device and the volatile memory device.

20. The system of claim 17, wherein the control circuitry further comprises a universal serial bus interface configured to allow for data to be extracted from the non-volatile memory device or the volatile memory device, or both.

* * * * *